Sept. 23, 1924.                                                                    1,509,456
J. VAN HÜLLEN
HYDRAULIC MOLDING PRESS
Filed Oct. 9, 1922
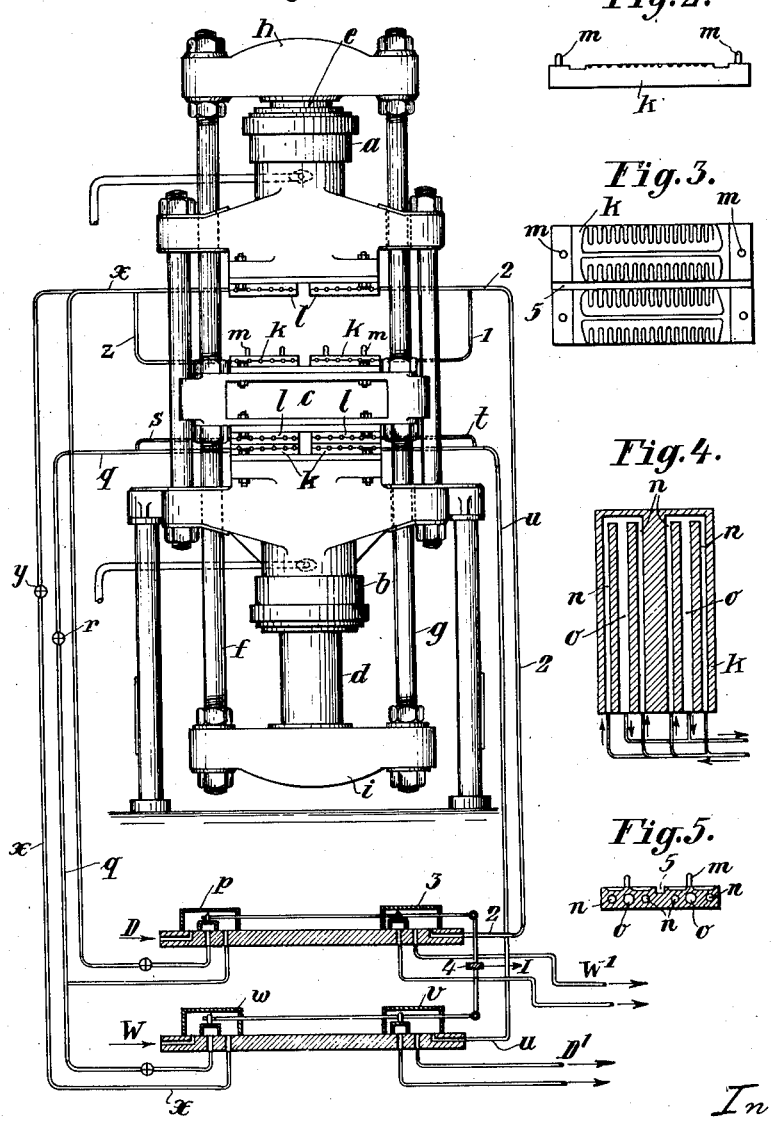
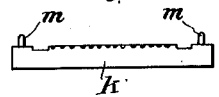
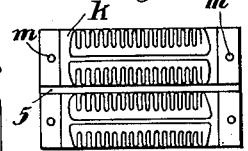
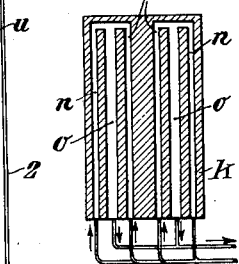
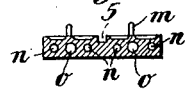
Inventor:
Josef van Hüllen
By
Attorney Patented Sept. 23, 1924.

1,509,456

UNITED STATES PATENT OFFICE.

JOSEF van HÜLLEN, OF CREFELD, GERMANY.

HYDRAULIC MOLDING PRESS.

Application filed October 9, 1922. Serial No. 593,411.

*To all whom it may concern:*

Be it known that I, JOSEF VAN HÜLLEN, a citizen of the German Republic, residing at Crefeld, Germany, have invented certain new and useful Improvements in Hydraulic Molding Presses, for which an application was filed Sept. 19, 1921, in Germany, by Nieder, and of which the following is a specification.

This invention relates to a double-acting hydraulic molding press for the manufacture of articles from a raw substance, such as celluloid, caoutchouc, soft metals and sheet metal or similar plastic or mouldable materials.

It is known in the art to produce from celluloid or caoutchouc e. g. combs with the aid of a molding press. It is common practice to employ for the purpose single acting hydraulic presses and comb moulds comprising each an upper and a lower part or half recessed to conform to the shape of the comb to be made. The process of making combs with the aid of said presses is very troublesome. Preliminarily the two halves or parts of the mould are heated by placing them upon heating plates which in turn are heated by means of steam or hot water. The temperature up to which the moulds are to be heated depends upon the material to be employed and is determined by fingertest. As soon as the heating of the mould has been continued for a length of time to ensure the desired temperature, a plate or sheet of celluloid or caoutchouc which likewise had been heated previously, is laid upon the lower half of the mould, the upper mould part is thereafter placed thereupon and the thus assembled mould halves with the heated sheet of shapable material between them is placed in the press. The pressing operation finished, the mould is cooled by means of cold water led into and through the hollow upper pressing plate with which the mould is in contact so as to be cooled indirectly through the agency of the said pressing plate. The mould is then removed from the press in order to be opened by means of suitable tools so that the comb can be taken out.

The above described process is very deficient and imperfect. Before all it is impossible for the operator to always obtain and ensure the same or suitable temperature by a primitive means such as the fingertest. In consequence thereof the combs or any other articles made are of unequal quality and much time is lost in assembling the mould parts and placing them in the press. After the pressing operation a length of time is to be spent in waiting for the mould being cooled and the subsequent opening of the firmly cohering halves of the mould also involves a good deal of work.

The object of my invention is to remedy the stated defects of the presses hitherto in use. The efficiency of the improved press embodying my invention is greatly increased by its construction in the form of a double acting hydraulic machine provided with a movable system of pressure pistons adapted to work alternately in opposite directions and further provide with a single pressing plate or a plurality of pressing plates or tables, the upper and lower faces of which are adapted to alternately cooperate with upper and lower stationary counter-plates or abutments. This method of alternately working in two directions affords a way for preparing and dressing the moulds on the one side for the subsequent pressing operation, while at the same time the moulds on the other side are in operation. In the new machine the moulds are directly heated and chilled by means of suitable fluids such as steam and water, respectively, passing therethrough, and a double valve control is provided in connection with a hand lever for causing at the same time the one mould or series of moulds to be heated and the other one to be chilled and vice versa. The conduits are arranged in a manner that when the cooling medium is applied to the mould the pressed comb therein will be chilled to solidify or harden first at and from the teeth across towards the back of the comb with the result that immediately upon the beginning of the chilling action there will be no possibility for material to flow off. Furthermore, the moulds are constructed and arranged in a manner that any material squeezed out from the mould and sticking to the latter can be readily removed therefrom.

The invention relates to other details also which will be fully described hereafter.

In the accompanying drawings:—

Figure 1 is a front view of the improved press provided with the controlling means for the heating and chilling of the moulds, and with the conduits for the heating and chilling media shown diagrammatically only; Figure 2 is a side view of the one part or half of a mould; Figure 3 is a plan of the same; Figure 4 is a sectional view of a mould part or half and Figure 5 is a cross-sectional view thereof.

The drawings illustrate by way of example a machine equipped with a single table only, but for persons skilled in the art it will be easily understood from the following description how the machine is to be altered and works if a further table would be arranged therein.

Mounted between the two pressing cylinders *a* and *b* is a table *c* connected with the pistons *d* and *e* of the said cylinders through rods *f* and *g* and by means of cross-heads *h* and *i* to form a rigid movable system, so that if the cylinder *a* is supplied with pressure fluid, the table is caused to move upwards, while at the same time the piston *d* is caused to go back into its cylinder and a pressing operation is brought about between the table and the counter plate or abutment connected with the upper cylinder *a*. On the other hand, the table will move downwards in case that the cylinder *b* is supplied with pressure fluid and consequently a pressing operation will be brought about between the table and the counter plate or abutment connected with the lower cylinder *b*. Figure 1 shows the parts of the machine in the latter condition. As will be seen there are two pairs of operating or pressing surfaces provided in the machine and in case of a compound machine having a plurality of pressing tables e. g. two such tables, there will be two groups of operating pairs of surfaces one of which, in each pair is free and ready for being prepared or dressed for a subsequent pressing operation, whilst the other one is in actuation.

The efficiency of the machine can be multiplied by providing a plurality of tables *c* in connection with the rods *f* and *g* between pressing cylinders such as or similar to *a* and *b*. In case of providing two tables *c* with a further stationary double acting abutment or counter-plate arranged therebetween on the stationary framing, each table will be caused to reciprocate between the counter-plate of the corresponding pressing cylinder and the stationary abutment or counter-plate interposed between the two tables.

Upper and lower mould halves are provided on the table or tables and on the abutments or counter-plates, and in the embodiment shown the upper moulds are actuated or working at the upward stroke of the pistons and the lower moulds are active at the downward stroke of the pistons.

The mould recessed to the required shape for the manufacture of combs comprises, as hereinbefore stated, two parts or halves, a lower half *k* and an upper half *l*. In the embodiment of the invention shown in the drawings the lower halves *k* of the moulds are rigidly connected with the lower abutment or counter-plate *b* and with the upper surface of the table *c*, respectively, and the upper halves *l* are firmly connected with, the upper abutment or counter-plate *a* and with the lower surface of the table *c*. The single mould halves are provided with registering pins *m* adapted to engage in correspondingly shaped holes provided in the opposed or co-operating halves of the moulds so that an absolutely accurate assemblage of the co-acting halves will be ensured for the subsequent pressing operation.

The two halves of the mould are each provided with passages or channels for the circulation of the heating or cooling fluid and also distributing chambers, not shown in the drawings, may be arranged therein. In the construction of the mould shown by way of example in Figures 2 to 5 and intended for the manufacture of combs four comb shaped recesses are provided therein both in the upper half and in the lower half correspondingly, for the production of four combs at each single pressing operation. In accordance therewith four inlets or admission passages *n*, Fig. 4 and 5 for the chilling and the heating fluid are provided in each half below the four rows of teeth of the said four recesses arranged in pairs, but two exhaust or exit passages *o* only are disposed therein below the longitudinal median line between the backs of each pair of recesses and communicating with the passages *n* so that the supplied heating or cooling fluid flowing in and through a pair of passages *n* will flow out through the one exit passage *o* communicating therewith and the fluid flowing through the other pair of passages *n* will flow out through the other exit passage *o*. Owing to the described construction the supplied chilling fluid acts to first cool down and harden the material in the comb-shaped recesses at the teeth portions thereof and to then cool and harden the back portions of the combs. As soon as the cooling fluid is admitted the plastic material between the two mould halves will be prevented from protruding beyond the joints of the mould.

The operation of the machine is as follows: Figure 1 shows as above stated, a machine with a single table *c* and in the operating position with the lower set of moulds in pressing condition and heated, that is to say, supplied with steam to keep the material in plastic condition. Steam is supplied, by any suitable conduit from any suitable source, at D to the slide valve *p* to flow through the piping *q*, a non-return valve *r* and a stationary conduit into stationary mould halves of the lower pressing cylinder *b*, and through a flexible conduit *s* into the movable mould portions atached to the bottom surface of the table c. The steam flows through all of the interconnected single moulds, further through the conduits t and u, the slide valve v and a pipe D¹ off to a condenser or the like.

At the same time the upper set of moulds are maintained in opened position and subject to the action of a cooling fluid. The latter is supplied by means of any suitable conduit at W to the slide valve w in order to flow through the piping x, a non-return valve y and a stationary conduit into the stationary mould halves l of the upper pressure cylinder a, and through a flexible conduit z into the movable mould halves k attached to the top surface of the table c. The chilling fluid leaves the mould halves through a flexible conduit 1 and a stationary or rigid conduit 2, respectively, to flow into a slide valve 3 and therefrom off into a conduit W¹. All of the four slide valves are positively connected through suitable rods with a common controlling lever or handle 4 so that the entire valve system is under the control of a single number.

When the pressing operation at the lower side of the table c is completed and the moulds at the upper side of the table have been properly dressed and filled in the mean time, the course of the heating and chilling fluids is changed by the means of the reversing lever 4. To this end the said lever is moved in the direction of the arrow I and thereby the set of upper moulds is supplied with steam or hot water whilst the set of lower moulds receive cold water or any other suitable chilling fluid. Thereupon the machine is reversed so that the upper moulds will become active or closed and the lower moulds opened to allow of the pressed combs being removed therefrom.

The machine as shown in the drawings is constructed to operate four moulds, two at each stroke, and each mould comprises four recesses so that eight combs will be made at each stroke. It goes without saying that the number of moulds in the machine is immaterial inasmuch as any desired or suitable number of moulds may be employed in conformity with the size of the machine or the size of the moulds desired to be given. In case of socalled double moulds, as shown in Figures 3 and 4, a groove or channel 5 may be provided between the two pairs of comb-shaped recesses to afford a means for readily removing all and any material that may have been squeezed out from the toothed edges of the two innermost recesses. To this end a rod or plunger may be employed for manually pushing out said material from the channel or channels 5.

It is obvious that changes might be resorted to in the form and arrangement of the several parts of the machine and of the moulds employed therein, without departing from the spirit and scope of my invention, hence I do not wish to limit myself strictly to the structure herein shown and described, but

What I claim is:—

1. A hydraulic press for making, by means of moulds, articles from shapable raw materials, such as celluloid, caoutchouc, soft metals, sheet metal, comprising a movable system of reciprocating pressure pistons, a pressure table mounted in said system to follow the strokes of said pistons, and stationary abutments mounted to co-operate with the two surfaces of the table.

2. A hydraulic press for making, by means of moulds, articles from shapable raw materials, such as celluloid, caoutchouc, soft metals, sheet metal, comprising two reciprocating pressure pistons, rods and cross-heads connecting the pistons to form a bodily movable system, a pressure table rigidly connected with said rods intermediate between the cross-heads and pistons, and stationary abutments adapted to co-operate with the two surfaces of the said pressure table.

3. A hydraulic press for making, by means of moulds, articles from shapable raw materials such as celluloid, caoutchouc, soft metals, sheet mteal, comprising two reciprocating pressure pistons, rods and cross-heads connecting the pistons to form a bodily movable system, a pressure table rigidly connected with the said rods intermediate between the pistons, a stationary cylinder for each of the two pistons to work in and stationary counter-plates rigidly connected with the said cylinders to serve as abutments for co-operation with the two surfaces of the said table.

4. A hydraulic press for making, by means of moulds, articles, from shapable materials such as celluloid, caoutchouc, soft metals, sheet metal, comprising two reciprocating pressure pistons one mounted above the other in vertically axial alinement, cross-heads connected with the outer ends of said pistons, rods connecting opposite ends of said cross-heads to form a bodily movable system, a pressure table rigidly connected with the said rods intermediate between the two pistons, a stationary cylinder for each piston to work in and stationary counter-plates rigidly connected with the said cylinders to serve as abutments for co-operation with the two surfaces of the said pressure table.

5. A hydraulic molding press, comprising two reciprocating pressure pistons, cross-heads connected with the outer ends of said pistons, rods connecting opposite ends of said cross-heads to hold the pistons in vertically axial alinement and to form a bodily movable system, a plurality of pressure tables rigidly connected with the said rods in intervals intermediately between the two pistons, a stationary cylinder for each piston to work in, and separate stationary counter-plates rigidly connected with each cylinder and rigidly mounted, respectively, between two tables.

6. The combination, in a hydraulic molding press, of the reciprocating table carrying the one half of the moulds, the stationary counter-plates carrying the registering other half of the moulds, passages, *n*, *o*, in the mould halves, conduits connecting said passages with sources of a heating and a chilling fluid, and a system of controlling valves in said conduits substantially as described.

7. The combination, in a hydraulic molding press, of the reciprocatory table carrying the one half of the moulds, the stationary counter-plates carrying the registering other half of the moulds, passages, *n*, *o*, in the mould halves, conduits connecting said passages with sources of supply, a pair of valves in the conduits simultaneously operable for the circulation of the heating fluid through the moulds, a pair of valves in the conduits simultaneously operable for the circulation of the chilling fluid through the valves, rods connecting the said valves in pairs, a means connecting said rods, and a handle in connection with said means for positively controlling the valve system to alternately supply the moulds with the heating and the chilling fluid.

In testimony whereof I affix my signature.

JOSEF van HÜLLEN.